June 6, 1961 J. BOCHAN 2,987,190
VIBRATION ISOLATING SYSTEM
Filed Sept. 21, 1959 6 Sheets-Sheet 1
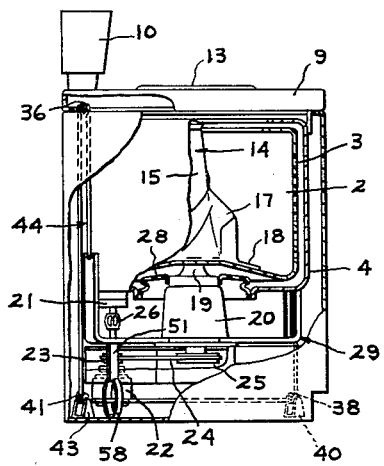
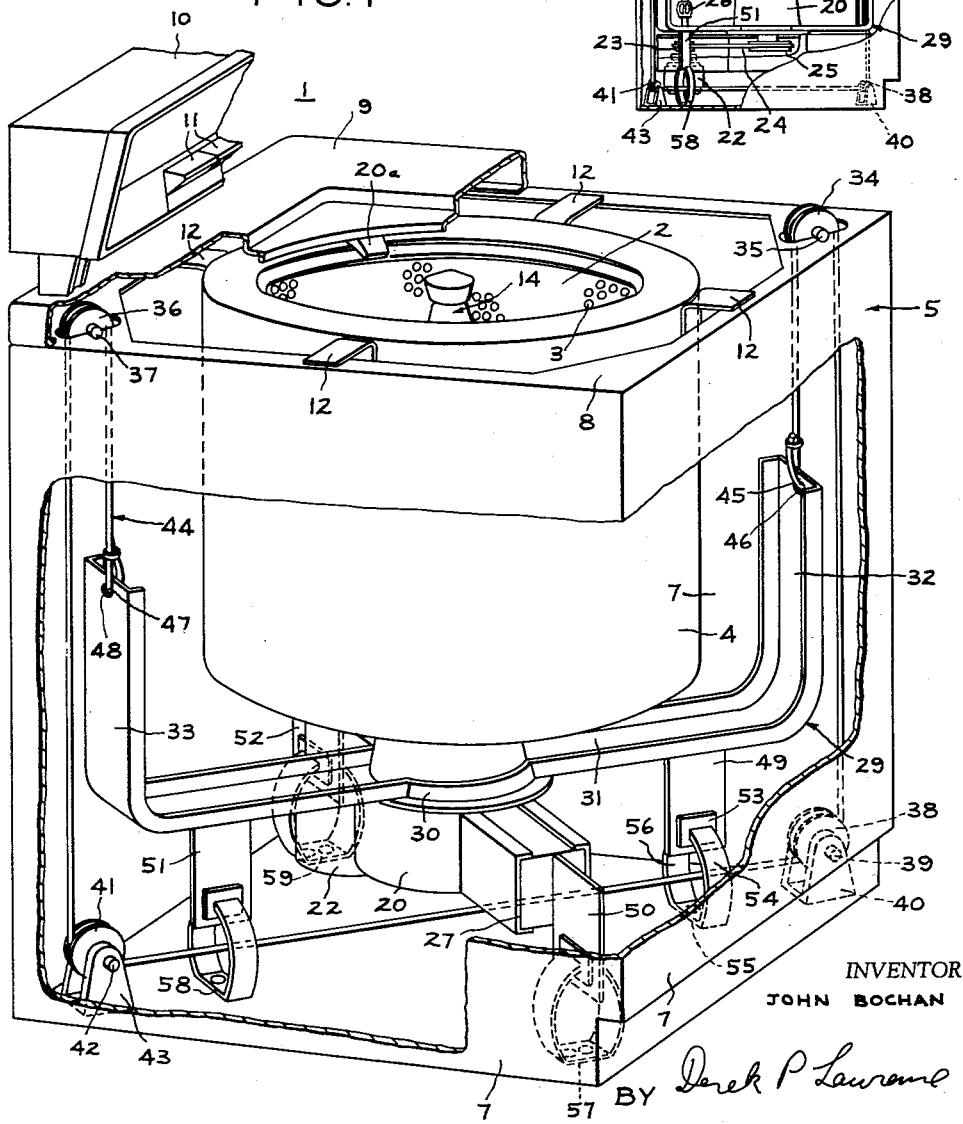
INVENTOR
JOHN BOCHAN
BY Derek P Lawrence
HIS ATTORNEY June 6, 1961  J. BOCHAN  2,987,190
VIBRATION ISOLATING SYSTEM
Filed Sept. 21, 1959  6 Sheets-Sheet 2

INVENTOR
JOHN BOCHAN
BY Derek P. Lawrence
HIS ATTORNEY

June 6, 1961  J. BOCHAN  2,987,190
VIBRATION ISOLATING SYSTEM
Filed Sept. 21, 1959  6 Sheets-Sheet 3
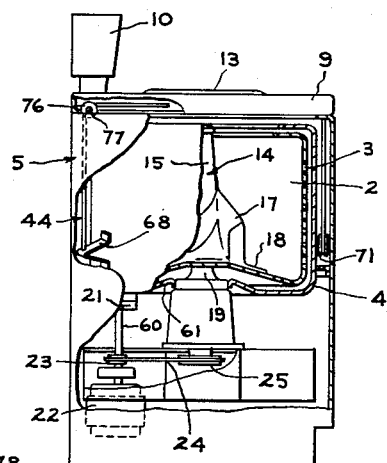
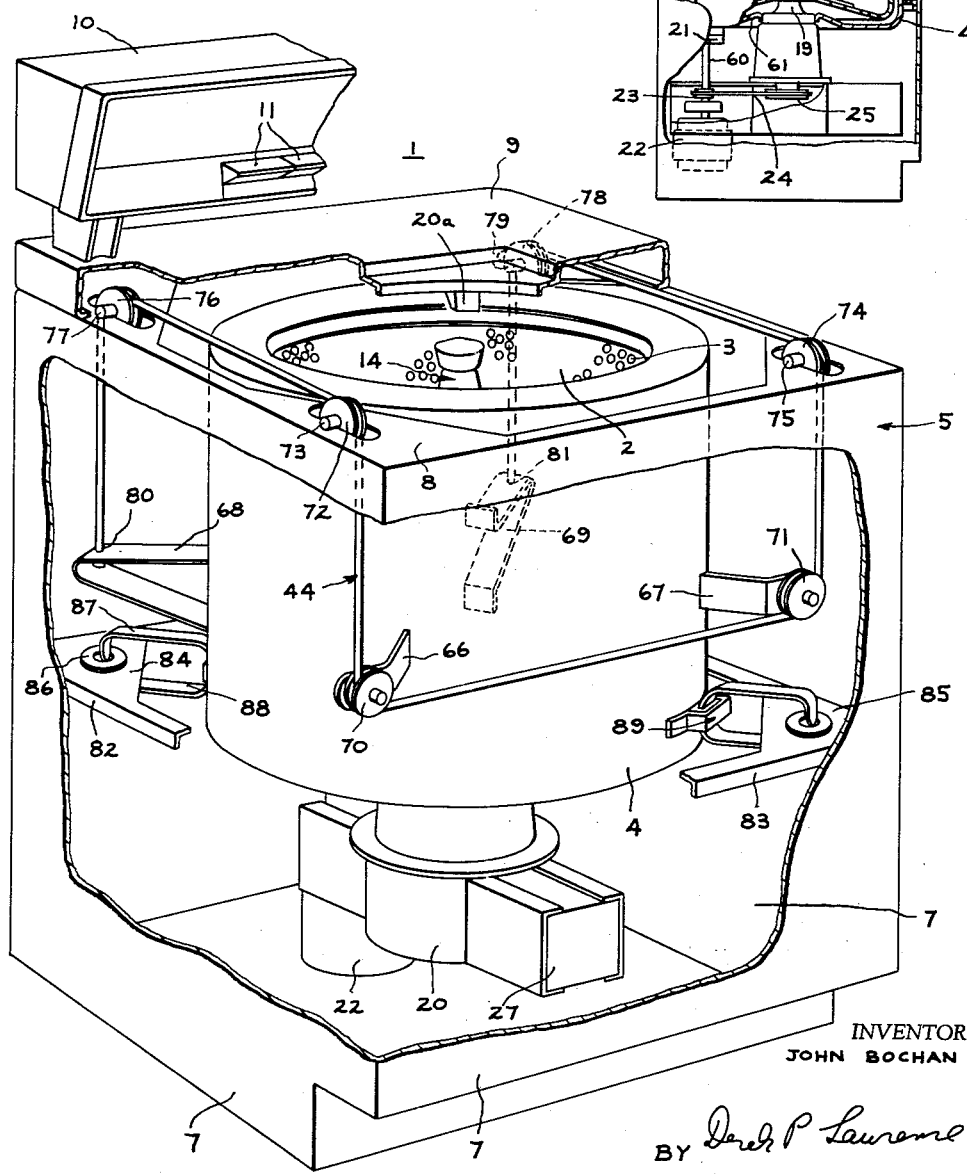
INVENTOR
JOHN BOCHAN
HIS ATTORNEY June 6, 1961  J. BOCHAN  2,987,190
VIBRATION ISOLATING SYSTEM
Filed Sept. 21, 1959  6 Sheets-Sheet 4

INVENTOR
JOHN BOCHAN
BY Derek P Lawrence
HIS ATTORNEY

June 6, 1961  J. BOCHAN  2,987,190
VIBRATION ISOLATING SYSTEM
Filed Sept. 21, 1959  6 Sheets-Sheet 5
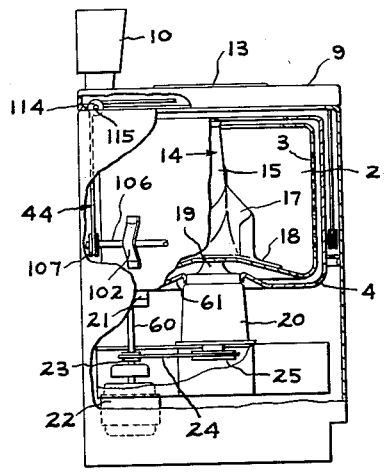
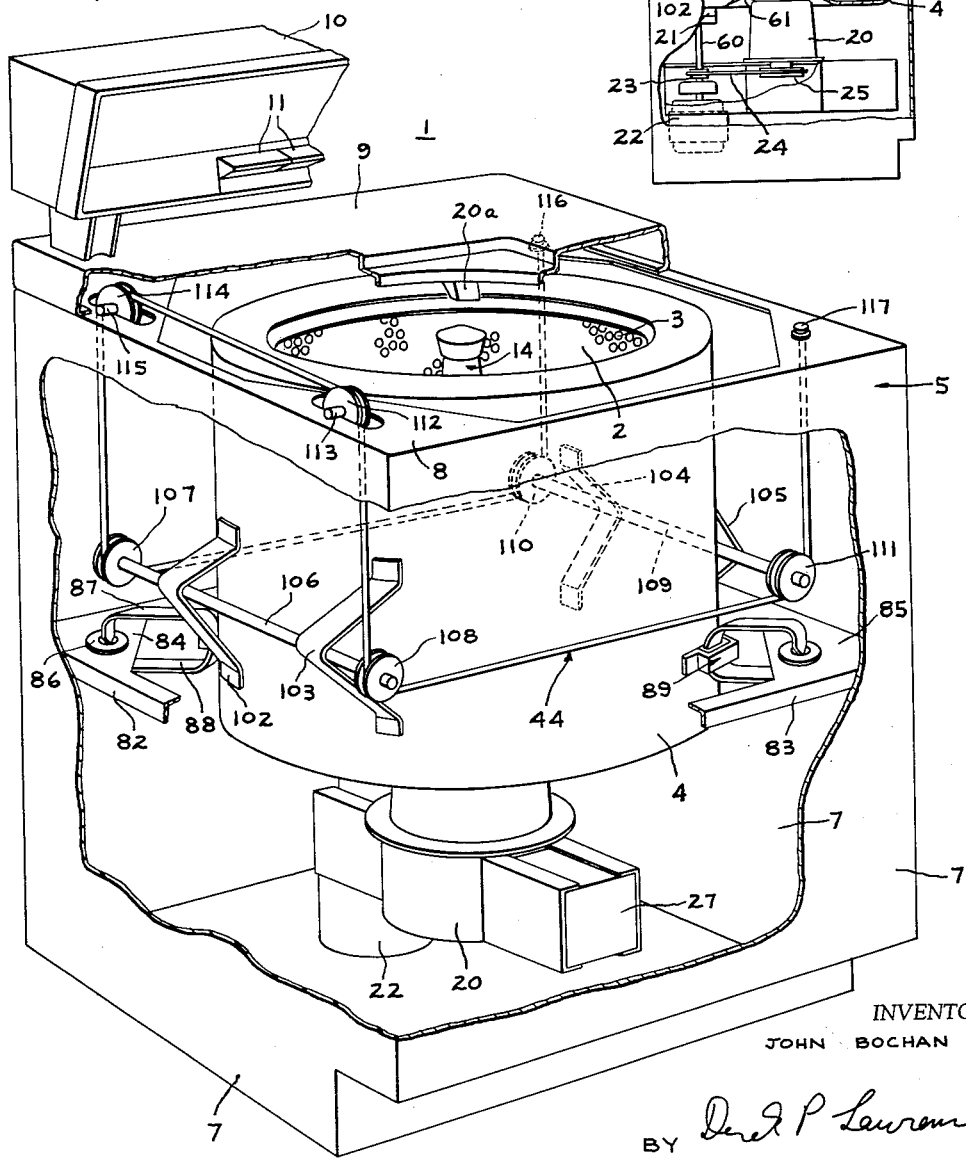
INVENTOR
JOHN BOCHAN
BY  *Derel P Lawrence*
HIS ATTORNEY June 6, 1961  J. BOCHAN  2,987,190
VIBRATION ISOLATING SYSTEM
Filed Sept. 21, 1959  6 Sheets-Sheet 6
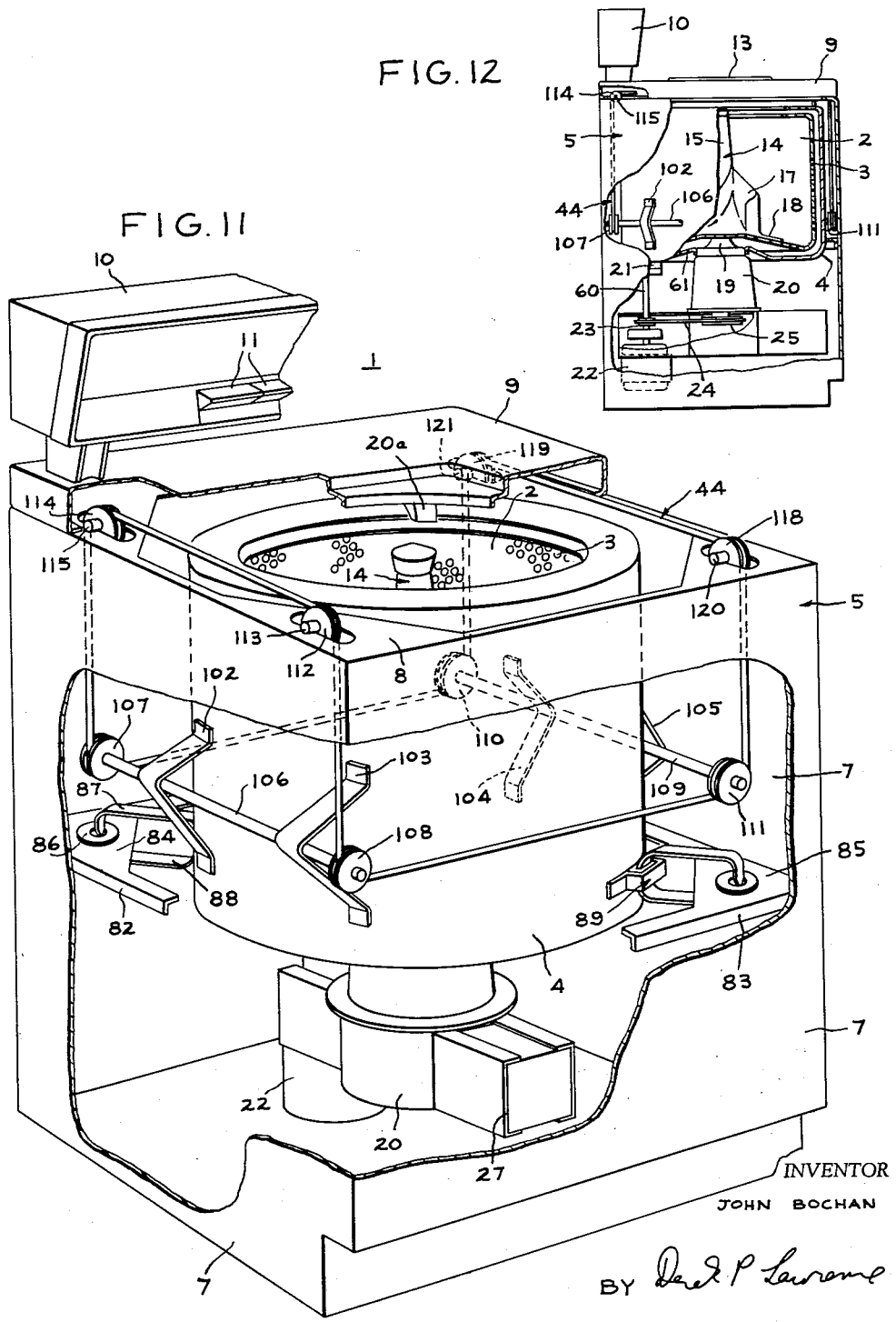
INVENTOR
JOHN BOCHAN
BY
HIS ATTORNEY

United States Patent Office 2,987,190
Patented June 6, 1961

2,987,190
VIBRATION ISOLATING SYSTEM
John Bochan, Louisville, Ky., assignor to General Electric Company, a corporation of New York
Filed Sept. 21, 1959, Ser. No. 843,611
15 Claims. (Cl. 210—364)

This invention relates to vibration isolating arrangements, and more particularly to suspension systems for isolating the vibrations of a moving system from the frame on which it is supported.

The problem of isolating vibrations of the moving parts of a machine from the stationary parts has been long recognized and many solutions have been proposed therefor. While many of the systems which have been evolved have been satisfactory, it has been found most difficult to provide an arrangement which, together with the elimination of undesirable vibrations in the supporting framework of the apparatus, is also economical while at the same time restricting the vibrational movement of the apparatus to a reasonable extent. In addition, it frequently occurs that the moving parts of such apparatus must often be allowed only a certain number of degrees of movement, and there is thus the problem of absorbing the vibrations between the moving system and the frame while retaining the motion of the moving system within the predetermined limits.

As an example of the problems encountered along this line, most automatic washing machines of the type presently commercially available for domestic use provide a clothes basket in which the clothes are washed and rinsed, and when it is desired to remove the liquid from the clothes the basket is rotated at a high speed so as to centrifuge the liquid out of the clothes. Very often the system for effecting the washing and centrifuging operations does not have its weight symmetrically distributed about the axis of rotation so that there is inherently an unbalance in the system. In addition, the clothes which are being laundered most often will not distribute themselves perfectly about in the basket but will provide an additional degree of unbalance. There is the further consideration that vibration-caused motion of the moving system must be maintained within reasonable limits, usually on the basis that the supporting frame or cabinet of the machine must be small enough to be commercially attractive for home usage. Yet a further item for consideration is that vertical axis washing machines, that is, washing machines of the type which have a basket open at its top which is reached through a lid in the top of the machine, generally should have a highly limited amount of vertical freedom, both for proper functioning of the apparatus itself and again because of the restrictions on size inherent in an appliance which is to be used in the space normally available in most homes.

It is therefore an object of the invention to provide an improved system which will be simple in structure and economical to manufacture yet which will effectively prevent the vibrations of the moving system from reaching the stationary part of the apparatus in which the moving system is included.

As a further object, directed toward apparatus having a particular type of moving system, it is an object of the invention to provide an improved vibration-eliminating suspension system for apparatus including components designed to centrifuge.

As a further object directed toward an even more specific structure, I provide by my invention an improved vibration-isolating suspension system for vertical axis washing machines.

A more specific object of the invention is to provide a vibration-isolating suspension system wherein suitable pulley means and an elongated flexible member, such as a cable, are used to suspend a moving system from a stationary frame.

In one aspect of my invention, I provide apparatus which includes moving parts and a frame which is provided for the purpose of supporting the moving parts without receiving the vibrations therefrom. A suspension system for securing the moving system on the frame includes an elongated flexible member and two pulley means positioned on two opposite sides of the moving system. The flexible means extends over the pulley means and has at least a pair of points of supporting engagement with the moving system. The two points are located on opposite sides of the moving system, above its center of gravity. From these points, the flexible member extends upwardly to, respectively, at least a second pair of points of supported engagement with the frame; the points of engagement with the frame are, again, located on the two opposite sides of the moving system. At least one of the pairs of points of engagement is provided by the aforesaid pulley means, i.e., the pulley means either are both secured on the frame or else both on the moving system.

Because this construction causes the moving system to be suspended above its center of gravity it tends to hang in a proper position, in much the same manner that a shopping bag carried by its two handles hangs down in the proper position. In addition, the arrangement of the pulley means and the flexible member causes vibrations of the moving system to be translated into movement of the flexible member over the pulley means. Not only has this been found to be a highly economical and operable suspension structure, but in addition it has been found that a great part of the vibrations which may originate in the moving system are prevented from reaching the stationary supporting frame, and that vertical motion of the moving system relative to the supporting frame is also substantially eliminated.

The features of the invention which I believed to be novel are set forth with particularity in the appended claims. The invention itself, however, both as to organization and method of operation, together with further objects and advantages thereof, may best be understood by reference to the following detailed description taken in connection with the accompanying drawings.

In the drawings, FIGURE 1 is a view in perspective, partly broken away and partly in cross section to show details, of a first embodiment of my invention as used in a vertical-axis washing machine;

FIGURE 2 is a side elevational view of the machine of FIGURE 1, also partly broken away and partly in cross section to show details;

FIGURE 5 is a view in perspective, partly broken away and partly in cross section to show details, of a second embodiment of my invention;

FIGURE 6 is a side elevational view, partly broken away and partly in cross section, of the machine of FIGURE 5;

FIGURE 9 is a view in perspective, partly broken away and partly in cross section to show details, of a fourth embodiment of my invention;

FIGURE 10 is a side elevational view, partly broken away and partly in cross section, of the machine of FIGURE 9;

FIGURE 11 is a view in perspective, partly broken away and partly in cross section to show details, of a fifth embodiment of my invention; and FIGURE 12 is a side elevational view, partly broken away and partly in cross section, of the machine of FIGURE 11.

Figure 4:
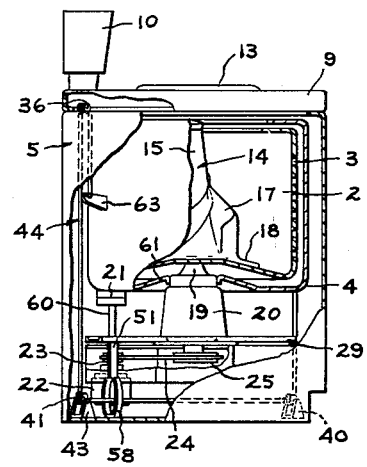
FIGURE 4 is a side elevational view, partly broken away and partly in cross section, of the machine of FIGURE 3.

Referring now to FIGURES 1 and 2 of the drawings, I have shown therein an agitator type vertical axis washing machine 1 having a clothes basket 2 which is provided over its entire side wall with perforations 3 and which is disposed within an outer imperforate tub or casing 4. Tub 4 is mounted within a frame or appearance cabinet 5 which includes a base 6, vertically extending walls 7, and a top portion 8. In addition, the appearance cabinet may be completed by a separate section 9 seated on top of portion 8 and which in turn supports a control panel 10 provided with appropriate controls such as 11. Tub 4 is secured to appearance cabinet 5 by any appropriate means such as, for instance, metal straps 12 which are secured at one end to portion 8 of the frame and at the other end to the side wall of tub 4. Thus, in effect, the tub forms part of the stationary portion of machine 1, being rigidly secured to the stationary appearance cabinet 5. The upper member 9 is provided with a suitable lid 13 which may be opened so as to provide ready access to the basket 2 for insertion and withdrawal of clothes.

At the center of basket 2 there is provided a vertical axis agitator 14 which includes a center post 15 and a plurality of suitably formed vanes 17. The agitator is further provided with an outwardly and downwardly flared skirt 18 to which the vanes aret joined at their lower ends. Both the clothes basket 2 and the agitator 14 are rotatably mounted. Thus, as indicated in FIGURE 2, the basket is secured to a rotatable member 19 extending up from within a transmission 20, and the agitator is mounted on a shaft (not shown) which extends upwardly from transmission 20 through member 19 and is joined to center post 15 of agitator 14 by any suitable means (not shown). During a typical cycle of operation of machine 1 liquid is introduced through an inlet 20a; then the agitator is oscillated back and forth within basket 2 to wash the clothes. After a predetermined period of this washing action, basket 2 is rotated at high speed to extract centrifugally the washing liquid from the clothes, the liquid passing through perforations 3 into the outer tub 4 and thence being removed by a suitable pump 21 to a drain. Following this extraction operation, a supply of clean liquid is then introduced into the basket for rinsing the clothes as the agitator is again oscillated. Finally, the basket is once more rotated at high speed to extract the rinse water and discharge it from the clothes so that it may be removed by pump 21.

Basket 2 and agitator 14 may be driven by any suitable means, as the drive means form no part of the present invention. However, by way of example I have shown them as driven from a reversible motor 22 which drives the basket and agitator through a drive including a clutch 23 mounted on the motor shaft. Clutch 23 allows the motor to start without load and then picks up the load as it comes up to speed. A suitable belt 24 transmits power to the transmission assembly 20 through pulley 25. Thus, depending upon the direction of motor rotation, pulley 25 of transmission 20 is driven in opposite directions.

Transmission 20 is so arranged that it supports and drives both the agitator drive shaft and the basket mounting member 19. When motor 22 is rotated in one direction the transmission causes the agitator 14 to oscillate within the basket 2. Conversely, when the motor 22 is driven in the opposite direction, the transmission drives the wash basket 2 and the agitator 14 together at high speed for centrifugal extraction. While the drive means forms no part of the present invention, reference is made to Patent 2,844,225 issued on July 22, 1958 to James R. Hubbard et al. and owned by the General Electric Company, assignee of the present invention. That patent discloses in detail the structural characteristics of a transmission assembly suitable for use in the illustrated machine.

Additional structural features which may be noted for a more complete understanding of the general driving arrangement provided in the washing machine of FIGURES 1 and 2 include a direct flexible drive 26 from motor 22 to pump 21, and a suitable counterweight 27 which, as shown in FIGURE 1, is positioned on the opposite side of the rotational axis of the basket 2 from the motor 22 so that, while there is necessarily some small unbalance resulting from the unsymmetrical structure of the driving system, it is held to a minimum. A further structural feature to be noted is the provision of a flexible boot member 28 which is secured at its inner edge to the top of the transmission 20 and at its outer edge to the tub 4. This arrangement provides a water tight connection between the transmission and the tub for retaining water in the tub and basket while at the same time permitting the relative motion between the tub and the basket which results from the fact that the basket is part of the suspended operating system of the machine (as will be more fully described herebelow) and the tub is secured to the stationary frame or appearance cabinet of the machine.

It will be understood that, while the description of the machine thus far excludes any substantial amount of detail relating to the drive, and does not show at all the valves and the particular controls normally provided on modern domestic washing machines, the elimination or simplification of these items is primarily for the purpose of permitting a clear explanation of the inventive concepts set forth below. In addition, it will readily be recognized that the omitted details are conventional items in all domestic washing machines, whose structure and positioning is well known to those skilled in the art.

As previously described, basket 2 is rotated at high speed to effect centrifugal extraction of the liquid from the clothes in the basket. As has also previously been mentioned, the structure of the machine itself and the arrangement of the clothes in the basket both tend to provide unbalancing forces which, during high speed rotation, cause vibration-inducing forces. These forces tend to result in gyrations of the moving system which includes the basket, transmission, motor and counterweight. It is important that the vibrations caused by the unbalance forces be prevented from reaching the frame, that is, the appearance cabinet, in any substantial amount since otherwise the machine will have a tendency to move about on the floor on which it is located and in fact might well be damaged by such vibrations.

In order to support the moving system on the stationary frame or cabinet 5, I provide a U-shaped flange member 29 rigidly secured at its center 30 to transmission 20 so as to form part of the moving system previously described. Member 29 has a central portion 31 which extends substantially horizontally and merges at its ends respectively into substantially vertically extending portions 32 and 33. Portions 32 and 33 extend upwardly, as shown, on opposite sides of the moving system outside tub 4.

A pulley 34 is rotatably secured on a pin 35 fastened in the top portion 8 of frame 5, the pulley being positioned substantially in a vertical plane. A second pulley 36 is similarly mounted on a pin 37, also fastened in the top portion 8 of frame 5. Pulley 36 is also positioned to rotate in a vertical plane. In fact, the pulleys 34 and 36 are located on the same two opposite sides of the moving system as the upwardly extending portions 32 and 33 of member 29. In addition, pulleys 34 and 36 are, in the embodiment of FIGURE 1, mounted to rotate in substantially the same vertical plane, which plane if drawn between them passes through the center of gravity of the moving system.

Below pulley 34 and on the same side of the moving system, a pulley 38 is mounted on a pin 39 fastened in a bracket 40 secured on the base of the machine; similarly, on the other side of the moving system below pulley 36, a fourth pulley 41 is rotatably mounted on a pin 42 mounted in a bracket 43 fastened to the base of the machine. An elongated flexible member, such as the cable member generally indicated at 44, has one end 45 secured within an opening 46 formed adjacent the upper end of portion 32 of member 29. From this point the cable extends upwardly, passing over pulley 34, and then extends downwardly to pass under pulley 38. From pulley 38, the cable then extends beneath the moving system to pulley 41, then up over pulley 36, and down to its end 47 which is secured in an opening 48 provided adjacent the upper end of portion 33 of member 29. The points of engagement of the ends 45 and 47 of the cable with the moving system are of course represented by openings 46 and 48 in which the cable ends are secured. It is of importance to my invention that these points be located above the center of gravity of the moving system.

The unbalance forces operating on the moving system when basket 2 is spinning at a relatively high speed cause basically two types of vibrational motion with my improved suspension system. First, there is a pendulous motion of the system in which it swings between the two pulleys 34 and 36 as though these were fixed points. Since the center of gravity is below the suspension plane where the cable is attached to portions 32 and 33 of member 29, the system is gravity centered and is stable. The second motion is a rocking motion which occurs about a point, in which one side of the moving system will tend to rise and at the same time the other side of the system will be lowered because of the continuous nature of cable 44 and its attachment to the two opposite sides of the system. Almost invariably, there is a combination of the two types of motions; however, their causes can, to some extent, be separated by stating that single plane unbalances (commonly called static unbalances) cause a predominantly pendulous motion, whereas a couple (equal unbalances removed from each other circumferentially by 180° and axially separated), also known as a dynamic unbalance, causes a predominantly rocking motion. While a couple is balanced in the static sense, it presents a dynamic unbalance which heretofore has proven to be one of the hardest to accommodate and isolate with a suspension system which also accommodates and isolates the more obvious static unbalances.

Thus, the only forces which can be transmitted to the frame 5 and to the floor are vertical forces which have very little harmful effect, and a very small amount of horizontal force due to the pendulous or swinging motion between the two pulleys 34 and 36. By far the greater part of the vibrational force of the moving system is absorbed by the cable suspension arrangement described and is therefore prevented from being transmitted to frame 5 and to the floor on which machine 1 rests.

In operation, the moving system of machine 1 is constructed to have relatively low critical or resonant speeds both for static and dynamic unbalances. At the dynamic unbalance resonant speed, the transmitted dynamic frame-vibrating forces are at a peak. Since vibrational forces at the critical speed increases approximately with the square of that speed, it is highly desirable, in order to keep these forces relatively small, that a low critical speed be provided by proper design of the machine. The design of machines to provide a low static unbalance resonant speed is well known. However, substantial difficulty has been encountered in the design of a system which will also have the desired low dynamic unbalance resonant speed. The cable suspension system described has been found very helpful in this respect in readily permitting a low critical speed design to be obtained for both types of unbalances. Once the moving system is operating above critical speed, the vibratory motion is a combination of a pendulous motion and a rocking motion which are isolated as described below.

It will of course be recognized that the extent of motion of the moving system as it passes through the critical speeds may be such as to require damping, particularly in cases where the system proceeds relatively slowly through the critical speed and the vibrational forces have a consequently longer time to operate. While this is not true where a high torque power source is available to push the system through critical speed quickly, it is not normally economically or practically feasible to provide such a source for domestic washing machines and, as briefly described above, a more conventional procedure is to provide a relatively small motor with clutch means for preventing sudden large torque requirements. As a result it is desirable in the machine described to provide suitable damping means; while these may take any of various forms, in the present case one preferred construction provides for four downwardly extending strip members 49, 50, 51 and 52. Strips 49 and 51 may be attached, as shown, to the underside of portion 31 of member 29, strip 50 is attached to the end of the counterweight 27, and strip 52 is attached to the moving system on the motor side. All of the strips 49, 50, 51 and 52 are thus secured on the moving system. Arranged in cooperative relationship with strip 49 is a frictional damper pad 53 biased against the surface of strip 49 by means of a spring 54 secured at its base 55 to the base 6 of the machine. A similar damping pad (not shown) engages the other surface of strip 49 and is biased thereagainst by a similar spring 56. It will readily be seen that as the moving system goes through its vibrational unbalance-caused motion, the pad 53 will rub over the surface of strip 49 to provide a damping effect. In the same manner, damping assembly 57 cooperates with strip 50, damping assembly 58 with strip 51, and damping assembly 59 with strip 52. The damping assemblies associated with strips 49 and 51 provide the desired damping in one vertical plane while strips 50 and 52 provide the necessary damping in a second vertical plane perpendicular to the first; thus, essentially uniform damping is provided for all motions allowed by the system.

It will be seen from the foregoing that a highly effective yet simple and economical suspension system is provided by my invention whereby a major part of the undesirable vibrations existing as a result of the operation of the moving system are prevented from reaching the frame of the machine and consequently the base or floor on which the machine stands.

While I have described a construction in which only two oppositely positioned pulleys 34 and 36 are provided, it will readily be understood that as many opposite pairs of pulleys may be provided as desired and the system will still be effective. For instance, another pair of pulleys similar to pulleys 34 and 36 might be inserted in the opposite corners of the machine, and a similar cable suspension system provided therewith. Thus, the provision of a single pair of oppositely disposed pulleys 34 and 36 will be understood to be for illustrative purposes only and any number of suspension system units such as the one described may be provided for effecting the suspension of the moving system.

Figure 3:
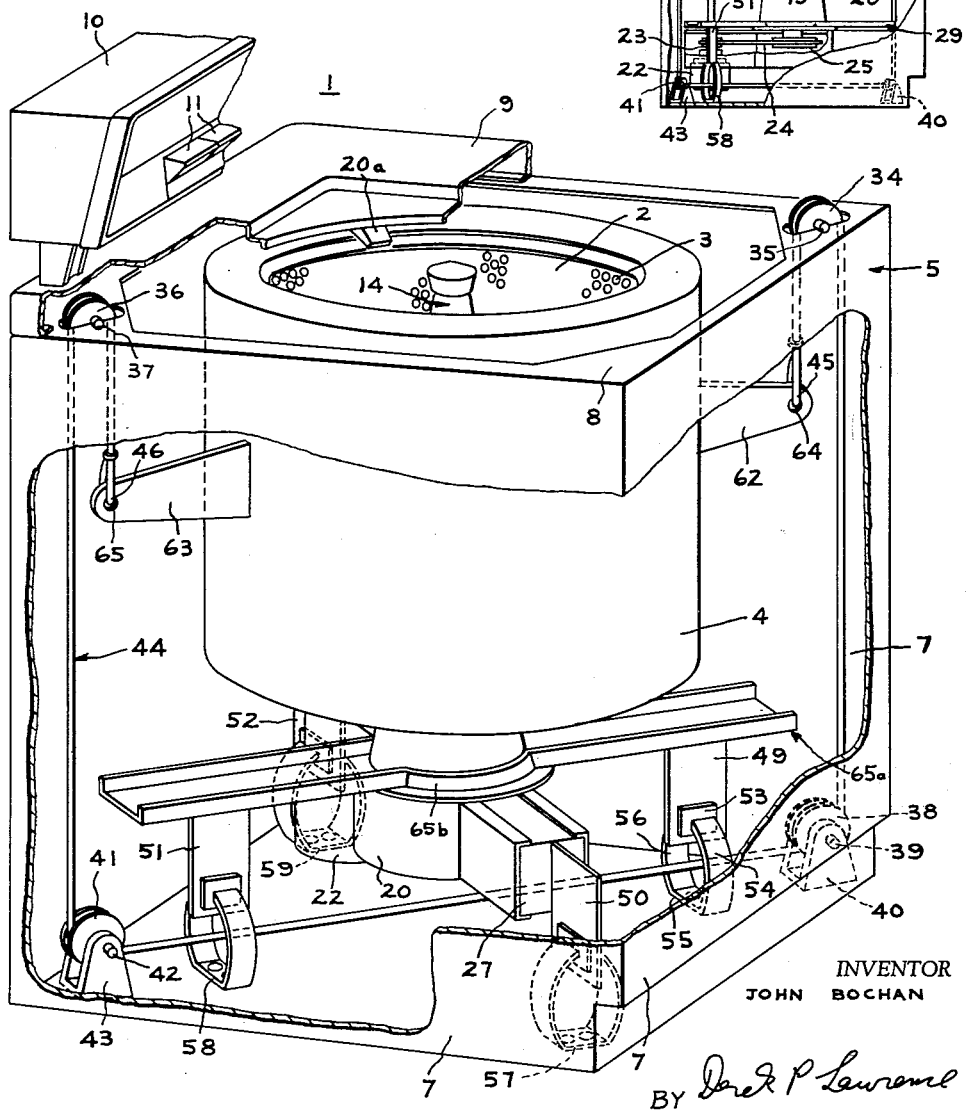
FIGURE 3 is a view in perspective, partly broken away and partly in cross section to show details, of the same embodiment of my invention in a different type of vertical axis washing machine.

Referring now to the use of the same suspension system in a modified type of washing machine, as illustrated in FIGURES 3 and 4, the structure will be described using like numerals to illustrate like parts. The main difference between the first structure described and the structure of FIGURES 3 and 4 is that, in the latter, tub 4 is rigidly secured at its base to the top of transmission 20 and is not secured to frame 5. Thus, the tub is part of the moving system rather than part of the stationary frame. As a result, since the tub has the same movement as motor 22, it is stationary with respect thereto and an ordinary shaft 60 may be used to connect motor 22 to drain pump 21. In addition, the fact that the tub 4 moves with the transmission 20 and basket 2 means that the lower portion 61 of the tub may be rigidly secured to the transmission rather than requiring, as in FIGURES 1 and 2, a flexible boot member. Also, because tub 4 is part of the moving system, it is not necessary to provide as in FIGURES 1 and 2 a member 29; instead, outrigger arms 62 and 63 are provided on the opposite sides of the moving system secured to and extending from tub 4. At the ends of the outrigger arms 62 and 63 there are provided openings 64 and 65 to which the two ends 45 and 46 of cable 44 are, as before, secured to the moving system at a point substantially above the center of gravity on opposite sides of the system. Also, a support member 65a, rigidly secured at its center 65b to assembly 20, is provided to support the damper assemblies. In all other respects the structure is the same as in the machine of FIGURES 1 and 2; the two systems of FIGURES 1 and 2 on the one hand and FIGURES 3 and 4 on the other hand operate in precisely the same manner: the cable and pulley arrangement provides for pendulous motion of the moving system between the two top pulleys, and for rocking motion of the moving system with one outrigger arm going up as the other one goes down. The two structures using the same embodiment of my invention are provided to show the ready adaptation of the system to the two most commonly encountered types of vertical axis washing machines, namely, the type wherein the tub is rigidly fastened to the frame and does not form a part of the moving system and the type where the tub is part of the moving system and is separated from the frame.

Referring now to FIGURES 5 and 6 a second embodiment of my invention will be described using the same numerals as previously used where like parts are referred to. Incidentally, in the embodiment of FIGURES 5 and 6, and in all the embodiments to be subsequently described, a vertical axis washing machine of the type wherein the tub 4 is part of the moving system is described, but it will readily be understood, by comparing the structures of FIGURES 1 and 3, that this is in no way to be considered a limitation on the invention as shown in the embodiments.

In FIGURE 5 I provide a first pair of outrigger arms 66 and 67 secured to tub 4 and a second pair of outrigger arms 68 and 69 also secured to the tub. Pulleys 70 and 71 are rotatably mounted on the first pair of arms 66 and 67 respectively. Directly above pulley 70 is a pulley 72 which is rotatably mounted on a pin 73 secured to the top portion 8 of the frame, and a pulley 74 is similarly mounted on a pin 75 secured on the fram 8 above pulley 71. A fifth pulley 76 is rotatably mounted on a pin 77 secured on portion 8 of the frame above the arm 68, and a sixth pulley 78 is rotatably mounted on a pin 79 secured on portion 8 of the frame above arm 69. The cable 44 has one end 80 secured to arm 68 and its other end 81 secured to arm 69. The pulley extends from end 80 over pulley 76, over pulley 72, under pulleys 70 and 71, over pulleys 74 and 78, and then extends downwardly and is secured to arm 69 at its end 81. In this particular case, it will be seen, the pulleys 70 and 71 form together a pulley system on one side of the moving system, and the ends of the cable 80 and 81 are both secured to outrigger arms on the other side of the moving system. One side of the moving system is supported by the engagement of the ends 80 and 81 of the cable with arms 68 and 69 respectively, while the other opposite side of the moving system is supported by the engagement of the cable with pulleys 70 and 71 which, as explained, are secured to the moving system. Pulleys 72 and 74 are secured on frame 5 on the same side of the moving system as pulleys 70 and 71 while pulleys 76 and 78 are secured to the frame on the same side of the moving system as ends 80 and 81 of cable 44. In each case, of course, the pulleys secured on the frame are above the engagement of the cable with the moving system so that the moving system is suspended from the frame as in the previous embodiment. The general operation of the device is similar in that a rocking motion of the moving system will cause one side of the moving system to go up while the other side goes down and vice versa. Also, a similar kind of pendulous motion is provided as before when the moving system swings between the pulleys secured to the frame.

As an example of a somewhat different type of damping system which may be provided where damping is needed (as in most conventional washing machines), I have provided a pair of rigid members 82 and 83 which are provided with flat upper surfaces 84 and 85 respectively and with similar flat lower surfaces (not shown). A frictional damper pad 86 is biased into engagement with surface 84 by spring member 87 which also secures the pad to the moving system. A similar pad (not shown) may be arranged to engage the under surface of member 82, being biased into engagement therewith by a spring member 88 which also secures it to the moving system. A similar frictional damping system 89 is secured to the opposite side of the moving system to cooperate with member 83. It will be seen that for the various rocking and pendulous motions, the pads will slide on the flat surfaces in frictional engagement therewith to provide the desired damping.

Figures 7, 8:
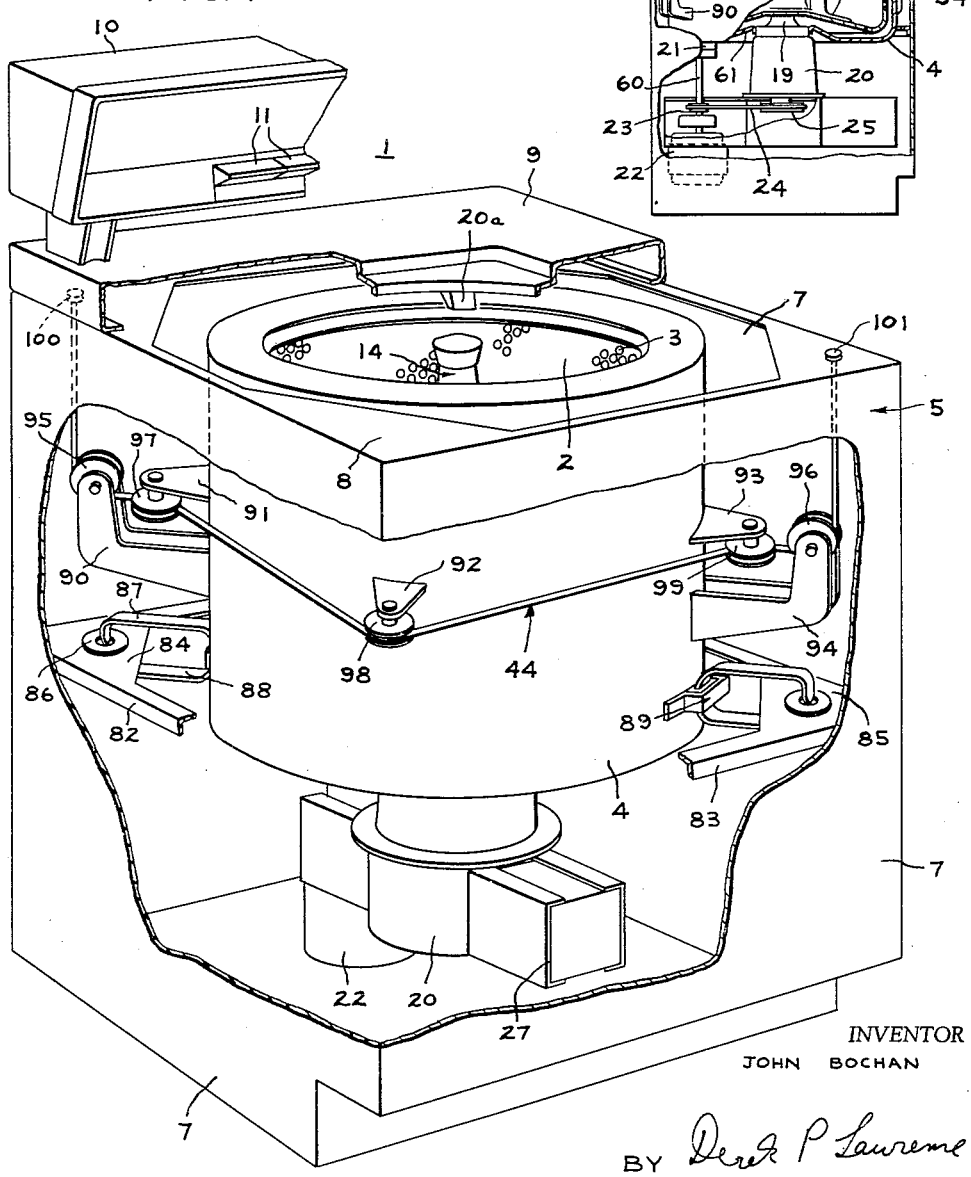
FIGURE 7 is a view in perspective, partly broken away and partly in cross section to show details, of a third embodiment of my invention.
FIGURE 8 is a side elevational view, partly broken away and partly in cross section, of the machine of FIGURE 7.

A third embodiment of the invention is shown in FIGURES 7 and 8 and will be described using like numerals for like parts. In this case outrigger arms 90, 91, 92, 93 and 94 are secured to the tub 4, which as previously stated forms part of the moving system. Arms 90 and 94 are positioned on opposite sides of the moving system and rotatably support pulleys 95 and 96 respectively. Each pulley rotates on a horizontal axis, the rotation may, as shown, be caused to occur in substantially a single vertical plane passing through the center of gravity of the moving system. Pulleys 97, 98 and 99 are respectively rotatably secured on arms 91, 92 and 93, these three pulleys being rotatable on vertical axes and in substantially the same horizontal plane above the center of gravity of the moving system. Cable 44 has one end 100 secured to portion 8 of the frame on the same side of the moving system as pulley 95 and thereabove, while the other end of the cable 101 is secured to portion 8 of the frame on the opposite side of the moving system above pulley 96. From its end 100, the pulley extends down under pulley 95, around the moving system via pulleys 97, 98 and 99, under pulley 96 and then up to its other end 101.

It will be seen that the moving system is suspended from the frame by the ends 100 and 101 of the cable 44, with the points of supporting engagement with the moving system of the cable being on each side of the moving system above the center of gravity of the system. Rocking motion of the moving system causes one side of the system to go up, as one of the pulleys 95 and 96 rides up the cable 44, while the other side correspondingly goes down. Similarly, the same type of pendulous motion as previously explained will occur, with the moving system swinging between ends 100 and 101 of the cable as fixed points.

Referring now to FIGURES 9 and 10, a fourth embodiment of the invention will be described using like numerals for like parts. In this case, on one side of the tub 4 (which, as before, forms part of the moving system) a pair of outrigger arms 102 and 103 are provided and on the other side a pair of similar arms 104 and 105 are provided. Arms 102 and 103 rigidly support a rod member 106 on which are rotatably mounted two pulleys 107 and 108. Similarly, arms 104 and 105 support a rod member 109 on which a pair of pulleys 110 and 111 are rotatably supported. It will be observed that pulleys 107 and 108 are secured on one side of the moving system and pulleys 110 and 111 are secured to the moving system on the other side thereof. A pulley member 112 is rotatably mounted on a pin 113 rigidly secured to portion 8 of the frame, pulley 112 being above pulley 108. Similarly, a pulley 114 is rotatably mounted on a pin 115 rigidly secured to the frame, the pulley 114 being above pulley 107 so that pulleys 112 and 114 are both on the same side of the suspended moving system.

Cable 44 has its ends 116 and 117 secured to frame 8 above pulleys 110 and 111 respectively so that the ends of the cable are both secured on the same side of the moving system and on the opposite side from the pulleys 112 and 114. From end 116 of the cable 44 the cable extends down under pulley 110, across and under pulley 107, up over pulleys 114 and 112, down under pulley 108, across and under pulley 111, and then up to its other end 117. The suspension action is again substantially the same as in the other preceding embodiments of the invention, with the rocking motion causing either pulleys 110 and 111 or pulleys 107 and 108 to ride up the cable and the other side of the moving system to correspondingly move down. Similarly, the same type of pendulous motion as provided before occurs herein.

Referring now to FIGURES 11 and 12, a fifth embodiment of the invention will be described using like numerals for like parts. As before, rod 106 is secured to one side of the moving system by outrigger arms 102 and 103 and rotatably supports pulleys 107 and 108. On the other side of the moving system arms 104 and 105 support rod 109 on which are rotatably mounted pulleys 110 and 111. Also as before, above pulley 108 there is a pulley 112 mounted on part 8 of the frame and above pulley 107 there is a pulley 114 also mounted on the frame. On the opposite side of the moving system from pulleys 112 and 114, a pair of pulley 118 and 119 are rotatably mounted on pins 120 and 121 secured on part 8 of the frame.

In this case, the cable 44 extends, starting with pulley 119, down under pulley 110, across and under pulley 107, up and over pulleys 114 and 112, down under pulley 108, across and under pulley 111, and up over pulley 118 back to pulley 119. It will be observed that in this embodiment cable 44 is continuous, i.e., it forms a closed loop and has no ends. The basic type of support provided is the same as before, both as to rocking and pendulous types of vibratory motion.

It will be seen from the foregoing that my invention may assume a variety of specific embodiments and, from the structures shown in FIGURES 1 and 3, that it is readily adaptable to different types of vertical axis washing machines. It will further readily be understood that the structure may be used for the suspension of other devices, that is particularly appropriate to use with centrifuging apparatus, and that its use may be extended even to other moving apparatus.

While in accordance with the patent statutes I have described what at present are considered to be the preferred embodiments of my invention, it will be obvious to those skilled in the art that various changes and modifications may be made therein without departing from the invention, and I therefore aim in the appended claims to cover all such changes and modifications as fall within the true spirit and scope of this invention.

What I claim as new and desire to secure by Letters Patent of the United States is:

1. A machine comprising a moving system including driving means and means driven at high speed by said driving means; a rigid frame provided for supporting said moving system, said frame including a base adapted to be seated upon a supporting surface; and means supporting said moving system on said frame so as to prevent a substantial part of any vibrations of said moving system from reaching said frame comprising an elongated flexible member, two pulley means positioned on two opposite sides of said moving system, said flexible member extending over said pulley means and having at least a first pair of points of supporting engagement with said moving system on said two opposite sides above the center of gravity of said moving system, said flexible member extending upwardly from its points of engagement with said moving system into respectively at least a second pair of points of supported engagement with said frame on said two opposite sides, said pulley means forming at least one of said pairs of points of engagement.

2. The apparatus defined in claim 1 wherein said moving system constitutes centrifuging means.

3. The apparatus defined in claim 1 wherein said machine is a laundry machine; said driven means comprises means for laundering clothes including a clothes basket, and said driving means comprises an electric motor secured to said basket for rotating said basket at a centrifuging speed.

4. The apparatus defined in claim 1 wherein first damping means is secured on said frame and second damping means is secured to said moving system, said first and second damping means engaging each other and forming together a damping system for said machine to limit vibrational movement of said machine.

5. A laundry machine having means for laundering clothes including a clothes basket rotatable on a substantially vertical axis, an imperforate tub surrounding said basket, and drive means for causing high speed rotation of said basket within said tub; a rigid frame for said laundering means including a base adapted to be seated upon a supporting surface; and means supporting said laundering means on said frame so as to prevent a substantial part of any vibrations thereof from reaching said frame comprising an elongated flexible member having its ends secured respectively to said laundering means on two opposite sides thereof above the center of gravity of said laundering means, first and second pulley means secured respectively on said frame on said two opposite sides of said laundering means above said flexible member ends, and additional pulley means secured on said frame, said flexible member extending from one of its ends first over said first pulley means, then over said additional pulley means, and finally over said second pulley means to the other of its ends, said additional pulley means being positioned to guide said flexible member around said laundering means.

6. A laundry machine having means for laundering clothes including a clothes basket rotatable on a substantially vertical axis and drive means for causing high speed rotation of said basket; a rigid frame for said laundering means including a stationary tub positioned in surrounding relation to said basket and a base adapted to be seated upon a supporting surface; and means supporting said laundering means on said frame so as to prevent a substantial part of any vibrations thereof from reaching said frame comprising an elongated flexible member having its ends secured respectively to said laundering means on two opposite sides thereof above the center of gravity of said laundering means, first and second pulley means secured respectively on said frame on said two opposite sides of said laundering means above said flexible member ends, and additional pulley means secured on said frame, said flexible member extending from one of its ends first over said first pulley means, then over said additional pulley means, and finally over said second pulley means to the other of its ends, said additional pulley means being position to guide said flexible member around said laundering means.

7. A laundry machine having means for laundering clothes including a clothes basket rotatable on a substantially vertical axis and drive means for rotating said basket at high speed and for causing washing operations to be provided in said basket; a rigid frame for said laundering means including a base adapted to be seated upon a supporting surface; and means supporting said laundering means on said frame so as to prevent a substantial part of any vibrations of said laundering means from reaching said frame comprising an elongated flexible member having its ends secured respectively to said laundering means on two opposite sides thereof above the center of gravity of said laundering means, first and second pulley means secured respectively on said frame on said two opposite sides of said laundering means above said flexible member ends, third and fourth pulley means secured respectively on said frame on said two opposite sides of said laundering means directly below said first and second pulley means respectively, said flexible member extending from one of its ends first over said first pulley means down to said third pulley means, then from said third pulley means across under said laundering means to said furth pulley means, and finally up over said second pulley means and down to the other of its ends.

8. Centrifuging apparatus comprising a container and means for rotating said container at high speed, a rigid frame for said apparatus including a base adapted to be seated upon a supporting surface; and means supporting said apparatus on said frame so as to prevent a substantial part of any vibrations of said apparatus from reaching said frame comprising an elongated flexible member having its ends secured respectively to said apparatus on two opposite sides thereof above the center of gravity of said apparatus, first and second pulley means secured respectively on said frame on said two opposite sides of said apparatus above said flexible member ends, and additional pulley means secured on said frame, said flexible member extending from one of its ends first over said first pulley means, then over said additional pulley means, and finally over said second pulley means to the other of its ends, said additional pulley means being positioned to guide said flexible member around said apparatus.

9. A machine comprising a moving system including driving means and means driven at high speed by said driving means; a rigid frame for said moving system including a base adapted to be seated upon a supporting surface; and means supporting said moving system on said frame so as to prevent a substantial part of any vibrations of said moving system from reaching said frame comprising first and second pulley means secured respectively to said moving system on two opposite sides thereof above the center of gravity of said moving system, an elongated flexible member, means on said opposite sides of said moving system supporting said flexible member on said frame, said means for supporting said flexible member including means securing both ends of said flexible member to said frame, said flexible member extending downwardly from each end thereof and passing under said first and second pulley means.

10. The apparatus defined in claim 9 wherein said moving system comprises centrifuging apparatus, and wherein said driven means comprises a container rotatable on its axis and said driving means comprises motor means connected in driving relation to said container.

11. The apparatus defined in claim 9 wherein said machine is a laundry machine, said driven means comprises means for laundering clothes including a clothes basket rotatable on a vertical axis, and said driving means comprises an electric motor connected to and positioned beneath said basket for causing high speed centrifuging rotation of said basket.

12. A laundry machine comprising means for laundering clothes including a rotatably mounted clothes basket and a driving motor connected to said basket; a rigid frame for said laundering means including a base adapted to be seated upon a supporting surface; and means supporting said laundering means on said frame so as to prevent a substantial part of any vibrations of said laundering means from reaching said frame comprising first and second pulley means secured respectively to said laundering means on two opposite sides thereof above the center of gravity of said laundering means, additional pulley means secured on said laundering means above the center of gravity of said laundering means, an elongated flexible member having its ends secured respectively to said frame on said two opposite sides of said laundering means respectively above said first and second pulley means, said cable extending from one of its ends first under said first pulley means, then over said additional pulley means around said laundering means, and finally under said second pulley means back to the other of its ends.

13. A laundry machine comprising means for laundering clothes including a basket mounted for rotation on its axis and an electric motor connected to said basket in driving relation thereto; a rigid frame for said laundering means including a base adapted to be seated upon a supporting surface; and means supporting said laundering means on said frame so as to prevent a substantial part of any vibrations of said laundering means from reaching said frame comprising an elongated flexible member having its two ends both secured to said frame on the same side of said laundering means, a pair of pulleys secured on said frame on the opposite side of said laundering means, a second pair of pulleys secured to said laundering means below the ends of said flexible member, and a third pair of pulleys secured on said opposite side of said laundering means respectively beneath said first pair of pulleys, said second and third pair of pulleys being respectively secured to said laundering means on the two opposite sides thereof, said flexible member extending from one of its ends under a first pulley of said second pair, then under a first pulley of said third pair, then over said pulleys of said first pair, then under the second pulley of said third pair, then under the second pulley of said second pair back up to its other end.

14. A machine comprising moving apparatus including driving means and means driven at high speed by said driving means; a rigid frame for said moving apparatus including a base adapted to be seated upon a supporting surface; and means supporting said moving apparatus on said frame so as to prevent a substantial part of any vibrations of said moving apparatus from reaching said frame comprising an endless elongated flexible member, a first pair of pulleys secured to said moving apparatus on one side thereof above the center of gravity thereof, a second pair of pulleys secured to the opposite side of said moving apparatus above the center of gravity thereof, a third pair of pulleys secured to said frame above said first pair on the same side therewith of said moving apparatus, a fourth pair of pulleys secured on said frame directly above said second pair on the same side of said moving apparatus therewith, said flexible member extending up from each of the pulleys of said first and second pairs to the pulley of said third and fourth pairs which is thereabove, said flexible member further extending between the two pulleys of said third pair and between the two pulleys of said fourth pair, said flexible member further extending from one pulley, of said first pair to one pulley of said second pair and from the other pulley of said first pair to the other pulley of said second pair, thereby to form a continuous supporting loop for said moving apparatus.

15. A machine comprising a moving system including driving means and means driven at high speed by said driving means; a rigid frame for said moving system including a base adapted to be seated upon a supporting surface; and means supporting said moving system on said frame so as to prevent a substantial part of any vibrations of said moving system from reaching said frame comprising an elongated flexible member having two ends both secured on the same side of said moving system above the center of gravity thereof, a first pair of pulleys both secured to said moving system on the opposite side thereof above the center of gravity thereof, a second pair of pulleys secured to said frame above said first pair of pulleys on the same side of said moving system therewith, a third pair of pulleys secured to said frame above said flexible member ends on the same side of said moving system therewith, said flexible member extending from one of its ends upwardly over the first pulley of said third pair, across over a first pulley of said second pair, then downwardly under said first pair of pulleys, then upwardly and over the second pulley of said second pair and the second pulley of said third pair, then downwardly to its other end.

References Cited in the file of this patent

UNITED STATES PATENTS

| | | |
|---|---|---|
| 335,654 | Taplin | Feb. 9, 1886 |
| 413,780 | Griswold | Oct. 29, 1889 |
| 1,707,032 | Thomson | Mar. 26, 1929 |
| 2,277,171 | Traylor | Mar. 24, 1942 |
| 2,454,112 | Woodson | Nov. 16, 1948 |
| 2,707,088 | Shelton et al. | Apr. 26, 1955 |

FOREIGN PATENTS

| | | |
|---|---|---|
| 584,314 | France | Feb. 5, 1925 |